United States Patent
Pierron et al.

(10) Patent No.: US 9,457,641 B2
(45) Date of Patent: Oct. 4, 2016

(54) HEAT EXCHANGER HAVING ELECTRIC HEATING ELEMENTS

(75) Inventors: Frederic Pierron, Rambouillet (FR); Laurent Tellier, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 299 days.

(21) Appl. No.: 14/007,464

(22) PCT Filed: Feb. 29, 2012

(86) PCT No.: PCT/EP2012/053477
§ 371 (c)(1),
(2), (4) Date: Nov. 18, 2013

(87) PCT Pub. No.: WO2012/130553
PCT Pub. Date: Oct. 4, 2012

(65) Prior Publication Data
US 2014/0061184 A1    Mar. 6, 2014

(30) Foreign Application Priority Data

Mar. 28, 2011  (FR) ..................... 11 00908

(51) Int. Cl.
*H05B 3/40* (2006.01)
*B60H 1/22* (2006.01)
(Continued)

(52) U.S. Cl.
CPC ............ *B60H 1/2225* (2013.01); *H05B 3/141* (2013.01); *H05B 3/42* (2013.01); *H05B 2203/023* (2013.01)

(58) Field of Classification Search
CPC .... B60H 1/2296; B60H 1/2225; B60H 1/14; B60H 1/00328; B60H 1/2228; B60H 1/2231; B60H 1/2234; B60H 1/2237; B60H 2001/2287; B60H 2201/2237; B60H 2201/2287; F24H 9/1872; F24H 9/1863; F24H 9/00; F24H 3/0405; F24H 3/04; F24H 3/29; H05B 3/24; H05B 3/14; H05B 3/16; H05B 3/32; H05B 3/22; H05B 3/26; H05B 3/262; H05B 3/141; H05B 3/42; H05B 3/50; H05B 2203/023; H05B 2203/009; H05B 2203/02
See application file for complete search history.

(56) References Cited

U.S. PATENT DOCUMENTS

2003/0132222 A1   7/2003   Bohlender
2005/0175328 A1   8/2005   Pierron et al.
(Continued)

FOREIGN PATENT DOCUMENTS

EP   1318694 A1   6/2003
EP   2056036 A1   5/2009
(Continued)

OTHER PUBLICATIONS

English language abstract for EP 1318694 extracted from espacenet. com database on Mar. 31, 2014, 13 pages.
(Continued)

*Primary Examiner* — Shawntina Fuqua
(74) *Attorney, Agent, or Firm* — Howard & Howard Attorneys PLLC

(57) ABSTRACT

The invention relates to an electrical heating device (1) including a heating body in which at least one electric heating element (8) is installed, the operation of said electric heating element being dependent on a control module (3) constituting the heating device, the heating body (2) including walls (5) at least partially defining a cavity (6) in which the control module (3) is accommodated, characterized in that the electrical heating element (8) and the control module (3) are suitable for being supplied with a so-called low voltage of between 80 and 600 volts, and in that an electrical insulator (17), which covers the walls (5) defining the cavity, is provided.

14 Claims, 2 Drawing Sheets

Figure 1:
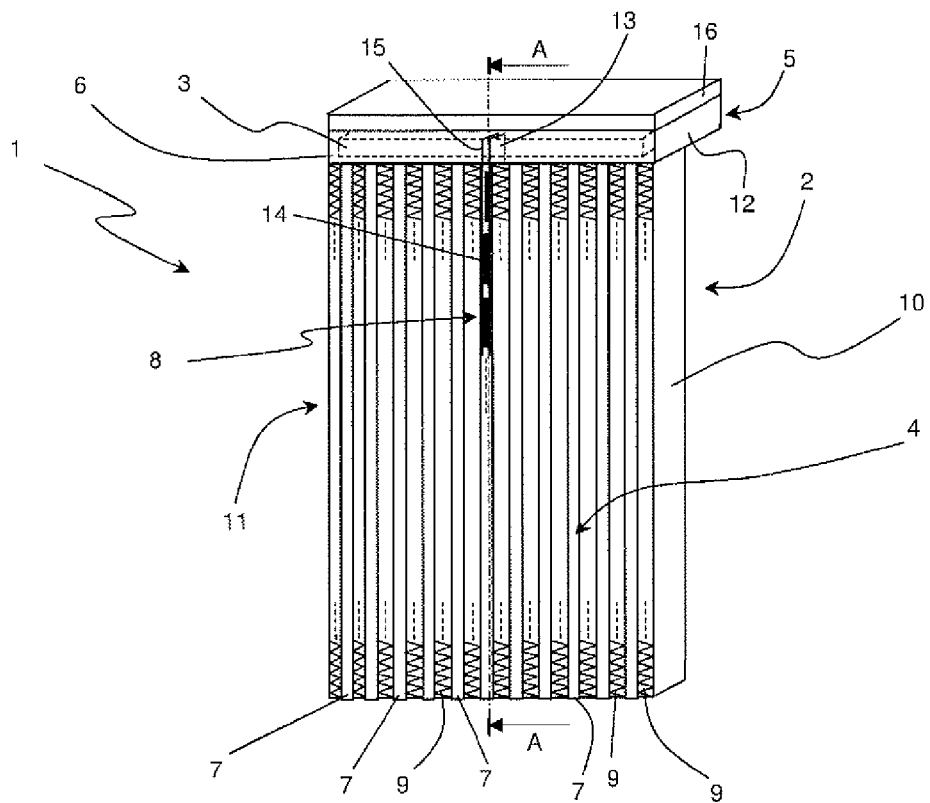

(51) Int. Cl.
*H05B 3/14* (2006.01)
*H05B 3/42* (2006.01)

(56) References Cited

U.S. PATENT DOCUMENTS

2008/0128401 A1* 6/2008 Bohlender ............ B60H 1/2225
219/202
2010/0086288 A1 4/2010 Pierron et al.

FOREIGN PATENT DOCUMENTS

FR 2855933 A1 12/2004
WO WO 03086018 A1 10/2003

OTHER PUBLICATIONS

English language abstract for EP 2056036 extracted from espacenet.com database on Mar. 31, 2014, 48 pages.
English language abstract for FR2855933 extracted from espacenet.com database on Mar. 31, 2014, 29 pages.
English language abstract for WO 03/086018 extracted from espacenet.com database on Mar. 31, 2014, 42 pages.
PCT International Search Report for PCT/EP2012/053477, dated Mar. 28, 2012, 7 pages.

* cited by examiner

HEAT EXCHANGER HAVING ELECTRIC HEATING ELEMENTS

RELATED APPLICATIONS

This application is the National Stage of International Patent Application No. PCT/EP2012/053477, filed on Feb. 29, 2012, which claims priority to and all the advantages of French Patent Application No. FR1100908, filed on Mar. 28, 2011, the content of which is incorporated herein by reference.

The technical sector of the present invention is that of the ventilation, heating and/or air conditioning installations mounted on a vehicle propelled by an electric motor. The invention more particularly targets an electric heating device mounted in these installations and passed through by a flow of air contained by a housing of this installation.

The increasing scarcity of oil resources is leading the automobile constructors to develop vehicles which operate from new energy sources. The propulsion of the vehicle by electrical energy is a solution which represents an interesting alternative and it is then necessary to install batteries to store this electrical energy and supply it to an electric motor which propels the vehicle.

The current vehicles equipped with an internal combustion engine ensure the heating of the passenger compartment by diverting all or some of the fluid which ensures the cooling of the internal combustion engine. This coolant heats up on contact with the internal combustion engine and gives up its calories to a flow of air sent into the passenger compartment, through heat exchange with a unit heater installed in the housing usually mounted under a dashboard with which the passenger compartment of the vehicle is equipped.

In the case of a vehicle with electrical or hybrid propulsion, propulsion modes exist in the absence of availability of the internal combustion engine that deprive the heating system of this source of calories. It is then known practice to ensure the heating of the passenger compartment by means of an electric radiator which draws its energy from a battery which also supplies the necessary energy to the electric propulsion engine.

However, such a solution presents a certain number of drawbacks. In practice, the power supply voltage of the electric radiator coupled with certain control modes (PWM) of such a heating apparatus can generate phenomena which create electromagnetic disturbances, the latter being translated into crackling interference when listening to the radio of the vehicle, in particular.

Moreover, the use of the voltage from the battery of the electric propulsion motor to power the electric radiator requires particular management of the risk of electrical arcing as a result of this voltage. This management is not performed efficiently in the prior art solution.

The aim of the present invention is therefore to resolve the drawbacks described above, primarily by producing a radiator which comprises a heating body in which is formed a housing which receives a device for controlling the rate of heating, this housing comprising an electrical insulation means, for example lined inside the housing in order to avoid any electrical arc between the heating body and the control device.

The subject of the invention is therefore an electric heating device or heat exchanger comprising a heating body in which is installed at least one electric heating element, the operation of which is placed under the dependency of a control module that is a constituent of the heating device, the heating body comprising walls delimiting, at least partially, a cavity in which the control module is housed, innovative in that the electric heating element and the control module are suitable for being powered at a voltage of between 80 and 600 volts, called low voltage, and in that an electrical insulator is provided which covers the walls delimiting the cavity.

According to a first feature of the invention, the walls which delimit the cavity are a bottom wall and peripheral walls perpendicular to said bottom wall.

Advantageously, the heating body comprises a tube bundle passed through by a flow to be heated, said tube bundle with said walls delimiting the cavity being joined together to form a single-piece unit.

According to a second feature of the invention, the electrical insulator takes the form of a flexible sheet with a form complementing the form of the walls delimiting the cavity, notably the bottom wall and the peripheral walls perpendicular to said bottom wall.

In this variant, the flexible sheet has at least one through hole through which at least one conductor powering the heating element passes.

According to a third feature of the invention, the cavity is closed by a cover.

In this variant, the cover is made of a metal material and comprises the electrical insulator arranged on its face turned toward the cavity.

Advantageously, the electrical insulator is produced from separate and adjacent portions.

Also advantageously, the single-piece unit is made of a metal material.

According to yet another feature of the invention, the electrical insulator takes the form of a layer of insulating material sprayed onto an internal face of the walls delimiting the cavity.

In one embodiment, the invention will be recognizable in that the control module comprises a first part matched to or passed through by the low voltage and a second part matched to or passed through by a voltage of between 5 and 48 volts, called very low voltage. The part of the PCB devoted to the low voltage will be recognized by the insulation distances between tracks that are much greater than the insulation distances used for the very low voltage part. A so-called galvanic insulation demarcation, otherwise called potential barrier, between the low and very low voltage parts will exist. Furthermore, the electrical connections between the control and the heating parts will be situated in the so-called low voltage area.

In such a situation, the first part and the second part are formed on one and the same printed circuit.

Finally, the invention also covers a ventilation and heating installation for a motor vehicle, notably driven by an electric motor, and comprising a heating device in which any one of the features described above is used.

A prime advantage according to the invention lies in simplified management of the risk of electrical arcing on a heating device supporting its own control means and powered by a high electrical voltage. In other words, the invention makes it possible to produce an electrical insulation at a lower cost for a low voltage radiator.

Another advantage lies in the simplicity with which such a heating device can be manufactured. The heating body is produced independently of the control module and it is the structure of this heating body, through the existence of the cavity, which provides an electromagnetic shielding. It is thus not necessary to add extra components to avoid electromagnetic disturbances.

Lastly, a final advantage lies in the possibility of easily recycling the heating body because the latter can be produced from one and the same material, for example an aluminum or aluminum alloy. It is thus also possible to produce the heating body unitarily, notably by joining together these various components by welding, notably brazing.

Figure 2:
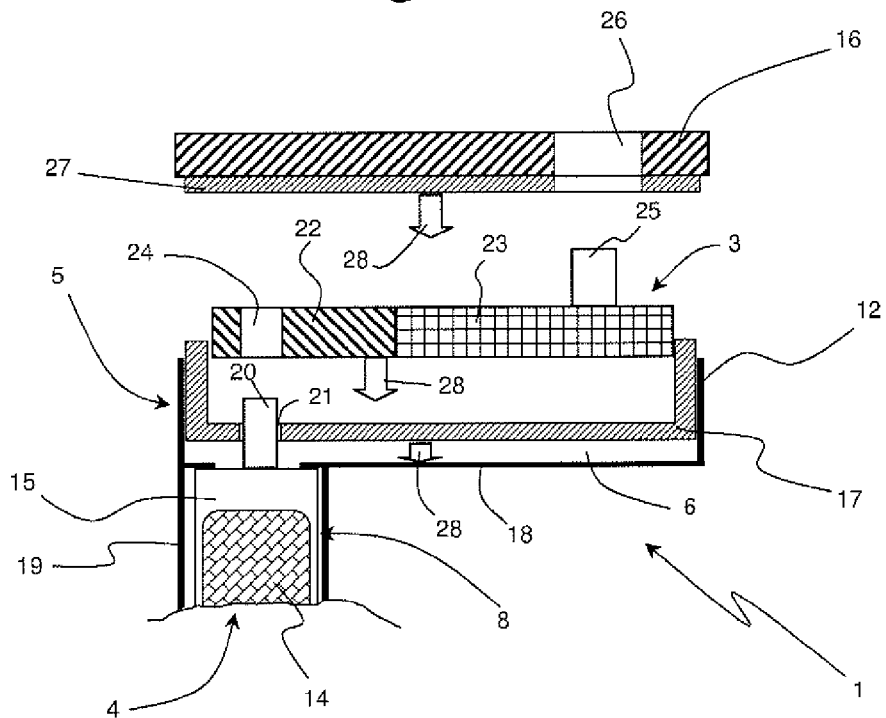
Figure 3:
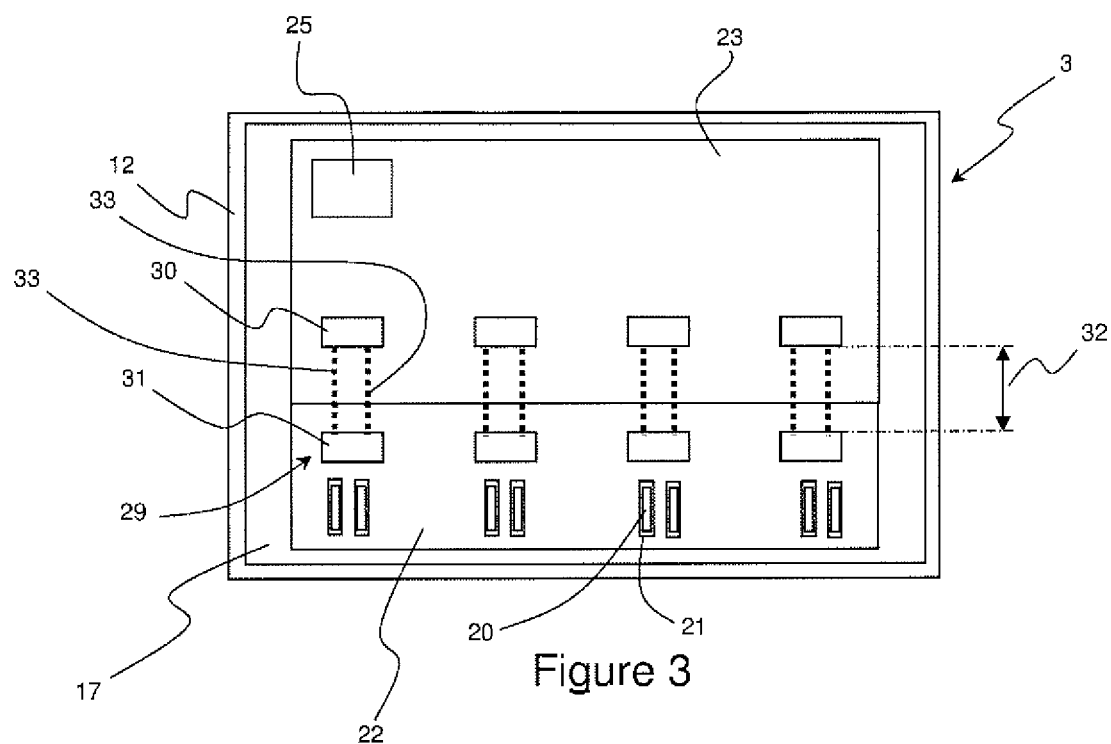

Other features, details and advantages of the invention will become more clearly apparent on reading the description given hereinbelow by way of indication together with the drawings in which:

FIG. 1 is a perspective view of an electric heating device according to the invention, FIG. 2 is a view of the cross section referenced A-A in FIG. 1, illustrating an embodiment of the control device incorporated in the electric heating device according to the invention, FIG. 3 is a plan view of the embodiment represented in FIG. 2.

It should be noted that the figures explain the invention in a detailed manner for implementing the invention, said figures obviously being able to be used to better define the invention if necessary.

FIG. 1 schematically illustrates the electric heating device 1 according to the invention. The latter mainly consists of two distinct parts electrically linked to one another: a heating body 2 and a control module 3.

The heating body 2 comprises a tube bundle 4 intended to be passed through by a fluid to be heated, the latter being able to be a gaseous fluid or a liquid fluid. In the case of a ventilation and heating installation for a motor vehicle, the gaseous fluid is a flow of air conveyed in the installation and reheated via heat dissipaters 9. In this same installation, the fluid in the liquid state can also be water with glycol added to it which circulates in the cooling system.

The heating body 2 is continued beyond the tube bundle 4 by walls 5 which edge a cavity 6, the latter delimiting an internal volume in which the control module 3 is installed.

The heating body 2 comprises a plurality of housings 7 which receive at least one electric heating element 8. FIG. 1 represents only a single electric heating element 8 but, obviously, this heating element is reproduced in each housing 7 that makes up the tube bundle 4 and extends from one end to the other of the housing 7 which receives it.

In a variant embodiment that is not represented, the heating body comprises a plurality of housings which receive, for example alternatively, an electric heating element and a heat transfer fluid circulating in a cooling circuit of a source of heat, such as an internal combustion engine. For this, the part of the heating body, opposite to that receiving the control module, comprises a water box, hereinafter called manifold, on which are arranged means for connection to the cooling circuit, said connection means forming input and output interfaces for the heat transfer fluid in the manifold.

Between each housing 7, there is installed a heat dissipater 9, the function of which is to increase the exchange surface area between the heating device according to the invention, in particular the electric heating elements 8, and the fluid which passes through the tube bundle 4. This heat dissipater 9 is, for example, a steel strip, folded in zig-zag fashion, and on which dampers to favor the heat exchange can be placed.

For reasons of simplicity, the dissipaters 9 are represented partially, but it is stipulated that these dissipaters extend over the entire length of a housing 7.

In practice, this housing 7 is produced by two plates, each bearing on the adjacent dissipater 9. According to another embodiment, the housing is implemented by a tube of rectangular or oblong section into which the electric heating element 8 is threaded.

The tube bundle 4 is edged by a first lateral flank 10 and a second lateral flank 11 which both extend beyond the tube bundle 4, in order to form the walls 5 which at least partially delimit the cavity 6. This delimiting is partial in that the walls 5 are situated at the bottom and on the sides of the cavity, the top being intended to be blocked by a cover 16.

The thickness of the cavity 6 is greater than the thickness of the tube bundle 4. In other words, the cavity 6 overhangs the tube bundle 4 in a plane orthogonal to a plane which passes through the face of the bundle passed through by the flow of air to be heated.

The cavity 6 is closed by the cover 16 which bears on an edge of peripheral walls 12 forming parts of the walls 5 surrounding the cavity 6.

The electric heating element 8 is, for example, made up of two electrodes 13 and 15, the function of which is to transport the electrical current from the control module 3 to heating ceramics 14 or stones with PTC (positive temperature coefficient) effect which form the heat source of the electric heating device 1 according to the invention.

The electric heating element 8 is thus made up of a first electrode 13 which is passed through by a negative electrical potential, from at least one heating ceramic 14 or stone with PTC effect and a second electrode 15 responsible for conducting the positive electrical potential to the ceramic 14.

It will very particularly be noted that the heating body 2, in particular the tube bundle 4, is electrically connected to an electrical ground that is separate from the electrical potentials applied to the electrodes 13, 15 described above. This thus avoids having the heating body being transformed into an antenna radiating electromagnetic disturbances as a result of the use of the low voltage and as a result of the control of PWM (pulse width modulation) type. This also allows the heating body to take on the function of electric shield.

FIG. 2 shows in more detail the heating device at the control module 3 level. FIG. 2 illustrates, by arrows referenced 28, the assembly phase by stacking together an electrical insulator 17, the control module 3 and the cover 16.

To avoid any electrical arc, the electrical insulator 17 is installed in the internal volume defined by the cavity 6, between the walls 5 of this cavity 6 and the control module 3. In other words, the electrical insulator 17 covers the walls of the cavity, in the sense that it is attached against the latter. For this, the electrical insulator 17 has a form complementing the form of the walls delimiting the cavity 6.

The walls, referenced 5 and delimiting the cavity 6, are formed by a bottom wall 18 and the peripheral walls 12. The bottom wall 18 is formed by a flat plate which extends in a plane orthogonal to the face 19 of the tube bundle 4 passed through by the flow, for example of air. The bottom wall 18 has at least one hole through which an electrical conductor 20 passes, the latter being used to convey the electrical current from the high voltage part of the control module 3 to the electrodes 13 or 15. This electrical conductor 20 forms an electrical terminal secured to the electrode, for example by welding. The hole may be continuous so as to accommodate a plurality of electrical conductors 20, but the bottom wall 18 may also have a multiplicity of holes, each hole being passed through by a single terminal or by the two terminals assigned to one and the same electric heating element 8. This bottom wall 18 forms part of the heating body 2 and is produced in the same material as the tube bundle 4. It is a metal material, for example an aluminum or aluminum alloy, in order to channel the magnetic fields created by the electromagnetic disturbances.

The peripheral walls 12 extend perpendicularly to this bottom wall 18. Said peripheral walls comprise a first flat which extends in the plane of the face 19 of the tube bundle 4 passed through by the fluid to be heated and a second flat, parallel to the first flat, and situated opposite the latter in relation to the control module 3. These peripheral walls 12 also comprise a portion of the first flank 10 and a portion of the second flank 11 which extend in the thickness of the cavity 6 orthogonally to the first flat and/or to the second flat. The peripheral walls 12 thus defined form a band around the cavity 6.

According to an exemplary embodiment, the electrical insulator 17 is formed by a flexible sheet which has a dielectric property, for example made of plastic, such as silicone. This flexible sheet has at least one hole 21 which passes through the flexible sheet from side to side. This hole 21 is formed in line with the electrical conductor 20 so as to allow its passage and thus enable it to be electrically connected to the control module 3.

This flexible sheet can be created and assembled for example by three methods. A first method consists in manufacturing the flexible sheet separate from the heating body and then adding this flexible sheet into the cavity. A second method consists in sealing the electrical conductors 20 then spraying a layer of insulating material, for example a dielectric plastic, onto an internal face of the walls 5 delimiting the cavity 6. A third method consists in sealing the electrical conductors 20 then dipping the cavity 6 in a bath of electrically insulating plastic material maintained in the liquid state.

The tube bundle 4 and the walls 5 delimiting the cavity are joined together to form a single-piece unit. It will thus be understood that the housings 7, the heat dissipaters 9, the lateral flanks 10 and 11 extended by the peripheral walls 12 and the bottom wall 18 form a unitary assembly that is advantageously manufactured from one and the same material. The one-piece or unitary nature is obtained, for example, by brazing these parts together. Such a configuration enhances the recyclability of the heating device according to the invention.

The cavity 6 serves as an area for receiving the control module 3. The latter is made up of a first part 22 passed through by the low voltage and a second part 23 passed through by a voltage of between 5 and 48 volts, called very low voltage. The first part 22 and the second part 23 are formed by one and the same printed circuit which supports electronic components powered by a low voltage, electronic components powered by a very low voltage and a galvanic insulation installed between the low-voltage components and the low-voltage components. The function of the galvanic insulation is to prevent any electrical crossover from the low voltage to the low voltage, in the event, in particular, of short circuit. This galvanic insulation for example takes the form of an optocoupler component and is capable of transferring the electrical signals or the electrical energy from the very low voltage components to the low voltage components, or vice versa, while preventing any physical contact, by virtue of the optical nature of the signal transmission in the case of an optocoupler, or the magnetic nature of the transmission of the electrical energy in the case of a transformer, for example.

The first part 22 intended for the low voltage is passed through from side to side by at most as many slots 24 as there are electrical conductors 20 which open into the cavity 6. Once joined together, this electrical conductor 20 passes through the slot 24 to be electrically connected to the low voltage electronic components installed on one and/or the other of the faces of the printed circuit. It will be noted that the electrodes of the electrical conductors 20 can be linked together by an intermediate part in order to limit the number of connections with the control card, such as, for example, by means of a connection device, called busbar.

According to this embodiment, it will be noted that the printed circuit that is a component of the control module 3 extends in a plane perpendicular to the plane of the face 19 passed through by the flow of air or the flow of liquid to be heated.

The control module 3 comprises at least one connector 25 intended to link the first part 22 and/or the second part 23 to the power and/or control network of the vehicle. This connector 25 passes through the cover 16 via an orifice 26 which passes through the thickness of the cover 16. To avoid any propagation of the electromagnetic disturbances through an open portion of the cavity, the cover is made of a metal material. Nevertheless, the use of this material also results in the risk of electrical arcing between the control module 3 and the cover 16. To rectify this situation, the cover 16 comprises the complementary electrical insulator 27 arranged on its face turned toward the cavity 6. As for the electrical insulator 17 arranged in the cavity 6, the latter can be produced by the addition of a plastic flexible sheet, by spraying or by dipping. The complementary electrical insulator 27 and the electrical insulator 17 may form one and the same piece, the complementary electrical insulator 27 being linked to the electrical insulator 17 by a hinge-forming portion in order to allow for the control module to be mounted in the cavity 6.

According to another variant, the electrical insulation is produced from separate and adjacent portions, these portions here being implemented by the electrical insulator 17 installed in the cavity 6 and the complementary electrical insulator 27 secured to the internal face of the cover 16, that is to say the face turned toward the internal volume of the cavity 6. The mounting of the control module 3 is then facilitated by the distinct nature of the portions of the electrical insulator while avoiding any risk of electrical arcing by the fact that these portions are immediately adjacent, and possibly in contact one against the other.

FIG. 3 shows a plan view of FIG. 2, in which the cover 16 has been removed. The peripheral walls 12 are in contact with the electrical insulator 17 and the control module 3 is received in a volume surrounded by the electrical insulator 17.

The printed circuit of the control module 3 is divided up into the first part 22 and the second part 23, the latter serving as a support for the connector 25. The first part 22 comprises a plurality of slots 21 through which an electrode 20 passes.

To guarantee an electrical insulation between the low voltage and the very low voltage on the same printed circuit, the galvanic insulator is installed. The optocoupler comprises a transceiver 30 and a transceiver 31 between which circulates a light signal 33. The distance, referenced 32, which separates the transceiver 30 from the transceiver 31 guarantees the electrical independence between the low voltage and the very low voltage on one and the same printed circuit.

The invention claimed is:

1. An electric heating device (1) comprising a heating body (2) in which is installed at least one electric heating element (8), the operation of which is placed under the dependency of a control module (3) that is a constituent of the heating device (1), the heating body (2) comprising walls (5) delimiting, at least partially, a cavity (6) closed by a cover (16) made of a metal material in which the control module (3) is housed wherein the electric heating element (8) and the control module (3) are suitable for being powered at low voltage and the control module (3) comprises a first part (22) passed through by the low voltage, and a second part (23) passed through by a voltage of between 5 and 48 volts, and wherein an electrical insulator (17) is provided which covers the walls (5) delimiting the cavity (6).

2. The device (1) as claimed in claim 1, in which the walls (5) which delimit the cavity (6) are at least one bottom wall (18) and peripheral walls (12) perpendicular to the bottom wall (18).

3. The device (1) as claimed in claim 1, in which the heating body (2) comprises a tube bundle (4) passed through by a flow to be heated, wherein the tube bundle (4) and the walls (5, 12, 18) are joined together to form a single-piece unit.

4. The device (1) as claimed in claim 1, in which the electrical insulator (17) is a flexible sheet with a form complementing the form of the walls (5, 12, 18) delimiting the cavity (6).

5. The device (1) as claimed in claim 4, in which the flexible sheet has at least one through hole (21) through which passes at least one electrical conductor (20) powering the electric heating element (8).

6. The device (1) as claimed in claim 1, in which the cover (16) comprises the electrical insulator (17) arranged on its face turned toward the cavity (6).

7. The device (1) as claimed in claim 1, in which the electrical insulator (17) is produced from separate and adjacent portions.

8. The device (1) as claimed in claim 3, in which the single-piece unit is made of a metal material.

9. The device (1) as claimed in claim 1, in which the electrical insulator (17) is a layer of insulating material sprayed onto an internal face of the walls (5, 12, 18) which delimit the cavity (6).

10. The device (1) as claimed in claim 1, in which the first part (22) and the second part (23) are formed on one and the same printed circuit.

11. A ventilation and heating installation for a vehicle, driven by an electric motor, the installation comprising a heating device (1) as claimed in claim 1.

12. The device (1) as claimed in claim 2, in which the heating body (2) comprises a tube bundle (4) passed through by a flow to be heated, wherein the tube bundle (4) and the walls (5, 12, 18) are joined together to form a single-piece unit.

13. The device (1) as claimed in claim 3, in which the electrical insulator (17) is a flexible sheet with a form complementing the form of the walls (5, 12, 18) delimiting the cavity (6).

14. The device (1) as claimed in claim 12, in which the electrical insulator (17) is a flexible sheet with a form complementing the form of the walls (5, 12, 18) delimiting the cavity (6).

* * * * *